March 4, 1930.  A. B. ABEL  1,749,239
SAFETY FRYING PAN
Filed Nov. 27, 1928
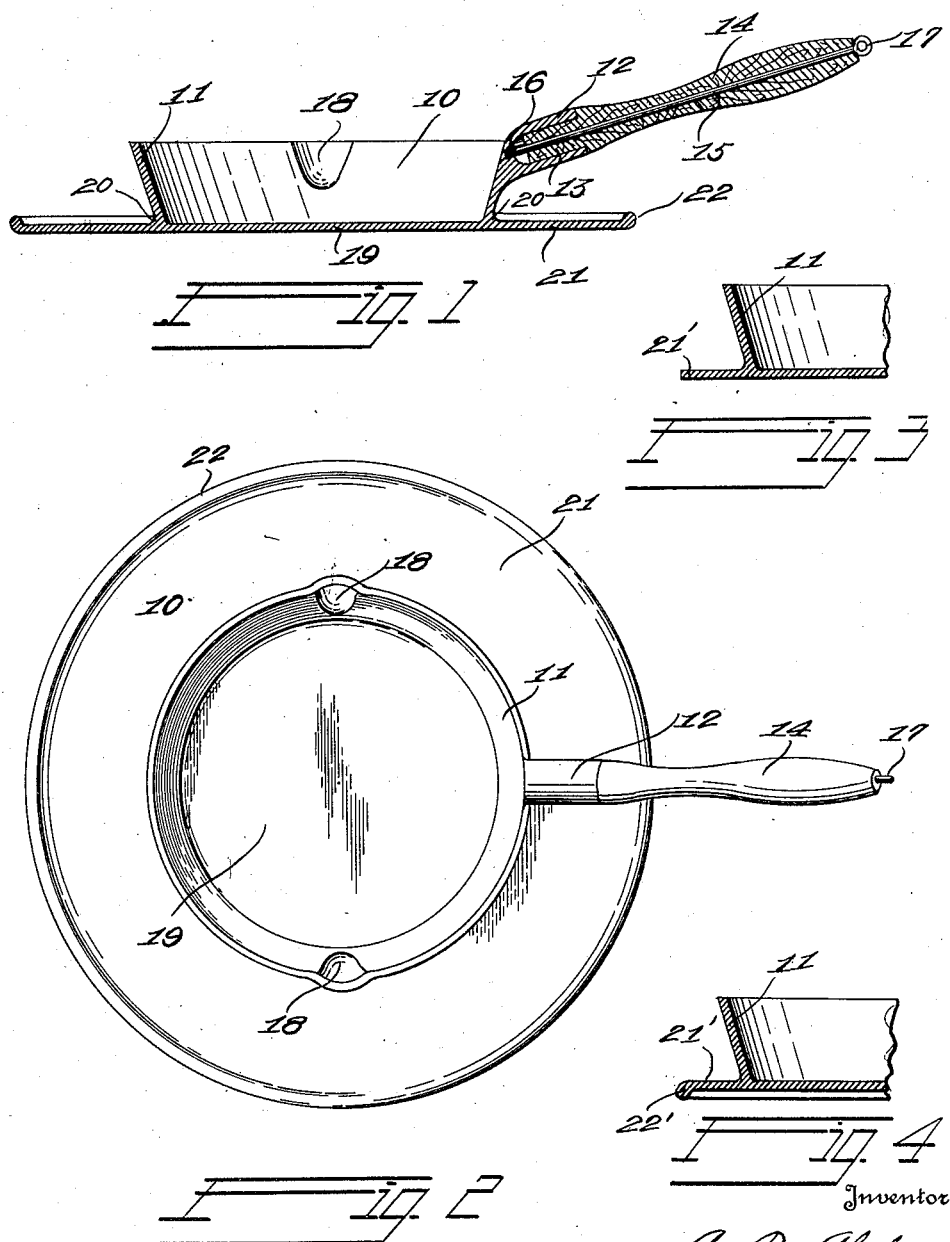
Inventor
A. B. Abel
By William A. Strauch
Attorney Patented Mar. 4, 1930

1,749,239

UNITED STATES PATENT OFFICE

ALBERT B. ABEL, OF SYDNEY, NEW SOUTH WALES, AUSTRALIA

SAFETY FRYING PAN

Application filed November 27, 1928. Serial No. 322,247.

This invention relates to improvements in cooking utensils.

More specifically the invention relates to an improved frying pan.

Frying pans, commonly called skillets as is well known are of a generally uniform construction comprising a relatively shallow cylindrical body portion and a bottom or base portion integrally united with the body portion, a suitable handle being secured to, or integral with said body portion.

In the use of pans of the above noted character it is hightly important in order to obtain the best results in frying operations that the heat be confined to the bottom of the pan in order that the food being fried be subjected to a uniform distribution of heat throughout the pan bottom contacting area thereof.

To obtain these results it is necessary to carefully and accurately adjust the flame such that the tip thereof just contacts the undersurface of the bottom of the pan but in frying operations which are usually rather hastily done time is not taken to accurately adjust the flame with the result that the flame spreads out over the bottom of the pan and plays up along the outer side thereof as is quite commonly experienced which results in a discoloration of the outside of the pan, sticking and burning of the food being fried adjacent the sides of the pan, unequal distribution of heat to the food being fried, unpleasant odors resulting from the flame contacting the frying fats and thus preventing further use thereof, causing the stove to become greasy due to fats running down the outer side of the pan, causing the handle to become heated such that it cannot be grasped by the bare hand, and very frequently the entire contents of the pan becomes ignited resulting in unpleasant odors as well as impairing the quality of the food.

Even when the flame is so adjusted that it is entirely confined to the bottom of the pan the hot fat quite frequently sputters over the edge of the pan which frequently directs the flame over the edge of the pan resulting in burning the fat and possibly the food and furthermore the fat under these circumstances runs down the outer side of the pan into contact with the flame under the pan resulting in unpleasant odors as well as a greasy stove.

It is accordingly a primary object of this invention to provide a frying pan of such construction that the above noted objections inherent in the commonly used frying pan are entirely eliminated.

It is a further object of the present invention to provide a frying pan which is simple in construction and which can be manufactured and sold at relatively low cost.

With the above objects in view as well as others that will become apparent from the following disclosure, reference will be had to the accompanying drawing forming a part thereof, and in which:—

Figure 1 is a central longitudinal sectional view of a preferred embodiment of my invention.

Figure 2 is a top plan view thereof.

Figure 3 is a fragmental sectional view depicting a modification of my invention.

Figure 4 is a fragmental sectional view depicting a still further modification of my invention.

Referring to the drawing by reference characters, in which like characters designate like parts, 10 designates the frying pan as a whole which is preferably an aluminum casting and which comprises an outwardly flared relatively shallow body portion 11 defining side walls provided with an integral handle supporting socket member 12 in which is detachably seated a reduced end portion 13 of a handle 14 which is held in position by means of a rod 15 extending lengthwise and centrally thereof. Rod 15 is threaded at one end thereof for detachable engagement with a threaded recess 16 in the base of socket member 12 and provided at the opposite end thereof with an eye member 17 for facilitating turning of rod 15 as well as providing a convenient means for hanging the pan from a pin or hook.

As indicated on the drawing body portion 11 is provided with the usual pouring spouts 18.

While a single embodiment of body portion and handle is disclosed various other forms thereof may be utilized as they do not form any part of the present invention.

Body portion 11 is integrally united at the inner edge thereof with a flat bottom or base portion 19, the central or body confined portion of which with body portion 11 forms a frying pan similar to those now in common use but as indicated base 19 is of considerably greater diameter than the inner edge of body portion 11 thus providing a comparatively wide outwardly projecting rim portion 21 having a marginal outturned lip 22 and united to body portion 11 by a fillet 20 and which forms the essence of the present invention.

In the use of the novel pan disclosed the food being fried is confined within body portion 11 in contact with bottom 19 in the usual manner but the projecting rim portion 21 which as shown is integral with body 11 and in the same plane as bottom portion 19 prevents the flame from playing over the outer side of the pan regardless of the adjustment thereof thus confining the heat of the flame entirely in the bottom of the pan which due to the uniform thickness of bottom 19 will be uniform throughout the bottom of the pan subjecting the food in contact with the bottom to uniform temperatures thus insuring a uniform frying thereof.

By the provision of rim 21 frying fats which may sputter over the edge of the pan are collected on the outer surface of rim 21 and confined thereon by lip 22 thus positively preventing contact of the fats with the flame and consequently avoiding disagreeable odors, burning of the fat or food, preventing the fats from coming in contact with the stove, and furthermore the projecting rim 21 prevents the outer side of the pan from becoming discolored due to contact of the flame therewith as well as preventing over heating of handle 14.

As will be seen, the construction disclosed while presenting the above noted desirable characteristics is comparatively simple, differing from the commonly used frying pan only in the provision of rim 21 which will add comparatively little additional expense to the manufacture of the pan and which due to its simple formation will offer no obstruction to the ready washing of the pan but on the contrary due to preventing the sides of the pan becoming discolored require less time for cleaning the pan than those now in use which are subject to discoloration by the flame.

While the projecting rim portion 21 is disclosed in Figures 1 and 2 of substantial width and provided with a marginal outturned bead on lip 22, the rim portion may be of substantial less width as indicated at 21' in Figure 3 and in which form of the invention the marginal lip or bead is omitted to facilitate cleaning the pan.

As indicated in Figure 4, the rim portion 21' is provided with a downwardly projecting lip or bead 22' adapted to confine the flame to prevent the flame from playing up along the margin of the rim portion 21' and accordingly confining the flame to the base thereof.

While I have disclosed but a single embodiment of my invention it will be understood that I am not limited thereto, but am at liberty to make such changes or alterations as fairly come within the scope of the subjoined claim.

Accordingly, what I claim as new and desire to secure by United States Letters Patent is:—

A frying pan comprising a flat bottom portion, side walls projecting outwardly from said bottom portion, said bottom portion projecting beyond said side walls defining a flat extension of sufficient extent to prevent contact of a heating flame with said side walls during frying.

In testimony whereof I affix my signature.

A. B. ABEL.